United States Patent [19]

Maxson

[11] Patent Number: 4,785,066

[45] Date of Patent: Nov. 15, 1988

[54] NOVEL ORGANOSILOXANE INHIBITORS FOR HYDROSILATION REACTIONS

[75] Inventor: Myron T. Maxson, Midland, Mich.

[73] Assignee: Dow Corning Corporation, Midland, Mich.

[21] Appl. No.: 144,209

[22] Filed: Jan. 15, 1988

Related U.S. Application Data

[60] Continuation-in-part of Ser. No. 059,356, Jun. 8, 1987, abandoned, which is a division of Ser. No. 899,111, Aug. 22, 1986, abandoned.

[51] Int. Cl.$^4$ .............................................. C08G 77/06
[52] U.S. Cl. ........................................ 528/15; 528/31; 528/32; 528/42; 556/475; 556/479; 556/467; 525/478
[58] Field of Search ................. 528/32, 42, 15, 31; 556/475, 479, 467; 525/478

[56] References Cited

U.S. PATENT DOCUMENTS

| | | | |
|---|---|---|---|
| 3,188,299 | 6/1965 | Chalk | 260/46.5 |
| 3,419,593 | 12/1968 | Willing | 260/448.2 |
| 3,445,420 | 5/1969 | Kookootsedes et al. | 260/37 |
| 3,498,945 | 3/1970 | Lefort et al. | 260/37 |
| 3,699,073 | 10/1972 | Wada et al. | 260/37 |
| 3,923,705 | 12/1975 | Smith | 260/2.5 |
| 3,989,667 | 11/1976 | Lee et al. | 260/46.5 |
| 4,256,870 | 3/1981 | Eckberg | 528/15 |
| 4,347,346 | 8/1982 | Eckberg | 528/32 |
| 4,348,531 | 9/1982 | Evans | 528/32 |
| 4,472,563 | 9/1984 | Chandra et al. | 528/15 |

*Primary Examiner*—Melvyn I. Marquis
*Attorney, Agent, or Firm*—Robert Spector

[57] ABSTRACT

Certain liquid polydiorganosiloxanes wherein each molecule contains at least one sequence of 2 or more vinyl radicals bonded to non-terminal silicon atoms extend the working time at 25° C. of organosiloxane compositions that cure by a platinum catalyzed hydrosilation reaction without adversely affecting the cure rate of the composition at temperatures of about 100° C. and above. The polydiorganosiloxane is prepared by the acid-catalyzed polymerization of the corresponding cyclic polydiorganosiloxanes in the presence of a chain-terminating organosilicon reactant.

3 Claims, No Drawings

NOVEL ORGANOSILOXANE INHIBITORS FOR HYDROSILATION REACTIONS

REFERENCE TO COPENDING APPLICATIONS

This application is a continuation-in-part of copending Application Ser. No. 059,356 filed on June 8, 1987, now abandoned, which is, a divisional of Application Ser. No. 899,111, filed on Aug. 22, 1986 now abandoned.

BACKGROUND OF THE INVENTION

1. Field of the Invention

This invention relates to organosiloxane compounds. More particularly, this invention relates to organosiloxane compounds capable of functioning as inhibitors for compositions which cure by a platinum catalyzed hydrosilation reaction. The inhibitor extends the working time of these compositions without adversely affecting the cure rate of the compositions at temperatures of about 100° C. and above.

Self-inhibiting polyorganosiloxane composition include one of the present compounds as at least a portion of the vinyl-containing polyorganosiloxane reactant in combination with an organohydrogensiloxane and a platinum hydrosilation catalyst.

2. Description of the Prior Art

One mechanism for curing organosiloxane compositions is by a hydrosilation reaction between a polyorganosiloxane containing two vinyl or other ethylenically unsaturated hydrocarbon radicals per molecule and an organohydrogensiloxane containing an average of at least three silicon bonded hydrogen atoms per molecule. Alternatively each molecule of the polyorganosiloxane contains three or more vinyl radicals and the organohydrogensiloxane contains two silicon bonded hydrogen atoms per molecule. The reaction is conducted in the presence of a platinum compound that is at least partially soluble in the reaction mixture.

In some instances the curing reaction will take place at temperatures of about 25° C. once all of the reactants and catalyst have been combined. For some applications it is desirable to delay curing of the composition at these temperatures in order to store the composition for several hours prior to curing, to obtain additional working time or to ensure that the composition will completely fill all parts of a mold before curing to the extent that the composition is no longer flowable.

Many different classes of compounds will inhibit platinum catalyzed hydrosilation reactions. One type of inhibitor is volatile and must be removed from the composition by evaporation for the hydrosilation reaction to proceed. Nonvolatile inhibitors are inactivated by heating.

Volatile inhibitors include the vinyl-containing cyclic organosiloxanes disclosed in U.S. Pat. No. 3,923,705. which issued to Smith on Dec. 2. 1975. the acetylenic alcohols such as 2-methyl-3-butyn-3-ol described in U.S. Pat. No. 3,445,420 that issued to Kookootsedes et. al on May 20, 1969. and some of the heterocyclic amines such as pyridine disclosed in U.S. Pat. No. 3,188,299 that issued on June 8. 1965.

Non-volatile inhibitors are exemplified by the alkyl maleates disclosed in U.S. Pat. No. 4,256,870. which issued to Ekberg on Mar. 17, 1981, and the olefinic siloxanes described in U.S. Pat. No. 3,989,667, which issued to Lee and Marko on Nov. 2, 1976.

The olefinic siloxanes described in the aforementioned Lee and Marko patent are reaction products of secondary or tertiary acetylenic alcohols with siloxanes having silicon-bonded hydrogen atoms. The reaction products contain from 3 to 10 siloxane units with a total of at least three units of the formula RHSiO or $R_2HSiO_{0.5}$ and at least one unit of the formula

where R represents a monovalent radical selected from the group consisting of hydrocarbon radicals and perfluoroalkylethylene radicals and R' represents a monovalent hydrocarbon radical substituted with a secondary or tertiary hydroxyl group.

Because the reaction products inhibit the hydrosilation reaction used to prepare them, the mixture of acetylenic alcohol, siloxane and platinum catalyst must be heated at temperatures above 100° C. to inactivate the inhibitor. In accordance with the teaching of Lee and Marko, the mixture of reactants is passed through a tube wherein the mixture is heated above 100° C. under sufficient pressure to maintain the reactants in the liquid state. The reaction product is typically a mixture wherein one or more of the silicon bonded hydrogen atoms on each molecule of the initial organohydrogensiloxane have been reacted.

The inhibitors of Lee and Marko are less than desirable because of the high temperatures and pressures required to prepare them and the difficulty of obtaining a pure material that will function reproducibly as an inhibitor.

Polydiorganosiloxanes containing vinyl radicals bonded to non-terminal carbon atoms are known materials. U.S. Pat. No. 3,498,945, which issued to Lefort et al on Mar. 3, 1970. discloses polydiorganosiloxanes containing at least one non-terminal vinyl radical and a viscosity of from 1 million to 25 million centipoise (1,000 to 25,000 Pa.s). The polydiorganosiloxanes are rubbery materials that are subsequently cured by a platinum-catalyzed reaction with an organohydrogensiloxane. Nowhere in the patent is there any indication that the disclosed vinyl-containing polymers can function as inhibitors to extend the working time of a curable composition at 25° C.

U.S. Pat. No. 4,256,870, which issued to R. P. Eckberg on Mar. 17, 1981 and U.S. Pat. No. 4,347,346. referred to hereinafter as the '346 patent, which issued to the same inventor on Aug. 31, 1982. both disclose organosiloxane release coating compositions comprising a vinyl-containing polydiorganosiloxane, an organohydrogensiloxane, a platinum catalyst for promoting curing of the composition and an inhibitor for preventing premature curing of the composition. The vinyl-containing polydiorganosiloxane can contain vinyl radicals at both terminal and non-terminal positions, and can be represented by the formula

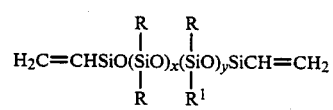

where R is a monovalent hydrocarbon radical free of ethylenic unsaturation and $R^1$ represents a vinyl or other ethylenically unsaturated hydrocarbon radical.

and the value of x and y are such that the polymer contains up to about 20 weight percent of the vinyl or other ethylenically unsaturated hydrocarbon radical represented by $R^1$. The '346 patent at column 9 lines 43 to 46 discloses that these polymers are produced by "well known means such as the KOH equilibration of methyltetramer (sic), methylvinyl tetramer and dimethylvinyl chainstoppers". Because no monovalent terminal units are specified one can only assume that the tetramers are cyclic diorganosiloxane oligomers.

The present inventor has found that polymerization of cclic diorganosiloxane oligomers using a basic catalyst such as potassium hydroxide results in multiple cleavages of silicon-oxygen bonds. When cyclic diorganosiloxane oligomers containing two different combinations of silicon-bonded hydrocarbon radicals, such as described in the examples of the '346 patent, are copolymerized the diorganosiloxane units from the cyclic methylvinylsiloxane are randomly distributed along the polymer molecule rather than being concentrated in groups as indicated by the structural formula on line 29 of column 5 of this patent.

U.S. Pat. No. 4.472,563, which issued to Chandra and Lo on September 18, 1984, discloses heat curable coating compositions comprising a polyorganosiloxane (A) containing at least one hydroxyl group or vinyl radical per molecule, an organohydrogensiloxane, a catalyst for promoting curing of the composition and an "ene-yne" compound of specified composition as a catalyst inhibitor. This patent teaches that the polyorganosiloxane A can be prepared by the hydrolysis and subsequent condensation of monomers containing a single silicon atom. It should be obvious to those skilled in the art of preparing organosiloxane copolymers that a reaction of this type involving two different monomers will yield polymers wherein the repeating units derived from the monomers are distributed randomly along the polymer molecule rather than being arranged in sequences as shown in the formulae on lines 11 through 15 of column 4 in this patent.

SUMMARY OF THE INVENTION

Applicant found that certain liquid polydiorganosiloxanes wherein each molecule contains at least one sequence of 2 or more vinyl radicals bonded to non-terminal silicon atoms will extend the working time at 25° C. of organosiloxane compositions that cure by a platinum catalyzed hydrosilation reaction. Polymers of this type cannot be prepared using the methods an catalysts disclosed in the prior art discussed in the preceding section of this specification.

Unlike many prior art inhibitors, Applicant's polydiorganosiloxanes do not adversely affect the cure rate of the composition at temperatures of about 100° C. and above.

DETAILED DESCRIPTION OF THE INVENTION

This invention provides a platinum catalyst inhibitor for extending the working time at 25° C. of polyorganosiloxane compositions curable by a platinum catalyzed hydrosilation reaction without adversely affecting the cure rate of said compositions at temperatures of at least about 100° C. where said inhibitor is represented by the average formula

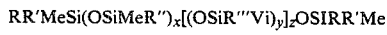

where Me represents methyl, Vi represents vinyl, R represents methyl, ethyl, phenyl or —CH2CH2Rf, R' represents methyl or vinyl, each R" and R'" are individually selected from the same group of radicals represented by R, Rf represents a perfluoroalkyl radical containing from 1 to 8 carbon atoms, the value of x is at least 4, the value of y is from 2 to 5, the value of z is at least 1. and said inhibitor is the product of an acidcatalyzed polymerization of a first cyclic diorganosiloxane containing repeating units of the formula MeR"SiO and a second cyclic diorganosiloxane containing repeating units of the formula R'"ViSiO, where said polymerization is conducted in the presence of an organosilicon compound comprising at least one unit of the formula RR'MeSiX where X represents a hydrolyzable atom or group.

One of the criteria used in selecting the hydrocarbon radicals represented by R, R" and R'" is the silicon bonded hydrocarbon radicals present in the curable composition into which the present inhibitors will be incorporated. These curable compositions typically include a polydiorganosiloxane containing an average of two vinyl or other ethylenically unsaturated hydrocarbon radicals per molecule, referred to hereinafter as ingredient A, an organohydrogensiloxane containing at least three silicon bonded hydrogen atoms per molecule, referred to hereinafter as ingredient B, in an amount sufficient to cure the composition to a product exhibiting the desired physical property profile, and a platinum-containing hydrosilation catalyst in an amount sufficient to promote curing of the composition at a temperature of about 100° C. or above.

As disclosed hereinabove. ingredient A can contain three or more vinyl or other ethylenically unsaturated radicals per molecule, in which instance ingredient B contains an average of two silicon bonded hydrogen atoms per molecule.

For the inhibitor to be effective it must be compatible with the other ingredients of the curable composition. particularly ingredient A. Typically at least a portion of the silicon bonded hydrocarbon radicals of the inhibitor should be identical with the hydrocarbon radicals present in ingredient A.

If it is desired to prepare an optically clear product such as a gel, the refractive indices of the inhibitor and ingredient A should be substantially identical. One of the factors affecting the refractive indices of these ingredients is the type(s) of silicon bonded hydrocarbon radicals present. It is therefore preferable that at least about 50 mole percent of the hydrocarbon radicals present on the inhibitor should match those of the polydiorganosiloxane. Even if this condition is met, the clarity of the cured composition may be adversely affected if the concentration of inhibitor exceeds about 1.0 percent by weight, based on the weight of ingredient A.

In a preferred embodiment of the present inhibitors the radical represented by R is methyl. R" is 3,3,3-trifluoropropyl, R'" is methyl x is from 10 to about 100, y is 3 or 4 and z is from 5 to about 20, inclusive.

The inhibitors of this invention can be prepared by reacting a vinyl containing cyclosiloxane of the formula $(R'''ViSiO)_y$ with a cyclosiloxane of the formula $(MeR'''SiO)_m$ and a chain-terminating organosilicon compound such as a linear siloxane of the formula $MeRR'Si(OSiMeR'')_nOSiR$ siloxane provides the terminal units of the final inhibitor. The concentration of this siloxane in the reaction mixture will be determined by the desired molecular weight of the inhibitor. In these formulae R, R', R'', Me, Vi, and y are as previously defined, m represents an integer of from 3 to 5, inclusive and n represents 0 or an integer from 1 to about 10, inclusive.

The reaction is conducted in the presence of a catalyst that will promote hydrolysis and polymerization of the cyclosiloxanes without cleaving a substantial number of the resultant linear molecules. Suitable catalysts include strong acids such as sulfuric acids, the alkanesulfonic acids and fluoroalkane sulfonic acids. Trifluoromethanesulfonic acid is particularly preferred because of its availability, catalytic activity and the minimal siloxane bond rearrangement occurring using this catalyst.

Basic catalysts such as the alkali metal hydroxides and silanolates are known to cleave and rearrange siloxane (SiO) bonds and therefore should not be used to prepare the inhibitors of this invention.

A characterizing feature of the present inhibitors is the presence of vinyl radicals on at least two adjacent, non-terminal silicon atoms. It is therefore of critical importance that the catalyst used to prepare the inhibitor not alter the location of adjacent vinyl radicals in the cyclosiloxane represented by the formula $(RViSiO)_y$.

The vinyl-containing cyclosiloxane is combined with the other siloxane reactants and the catalyst. The resultant mixture is then heated at temperatures of from about 30 to about 80° C. for a period of from 1 to about 8 hours with stirring to ensure intimate contact between all reactants.

Heating of the reactants is continued until the desired molecular weight has been achieved, as determined by the concentration of the aforementioned linear siloxane in the reaction mixture. Further reaction serves no useful purpose. and may even be detrimental by causing rearrangement of the siloxane units in the inhibitor.

Techniques for determining the molecular weight of a polyorganosiloxane include viscosity measurement, gel permeation chromatography and osmometry. These techniques are well known, and do not form part of this invention.

Up to about 200 parts by weight of water per million parts by weight of cyclosiloxane can be included in the initial reaction mixture to facilitate the hydrolysis and ring-opening of the cyclosiloxane reactants.

Following completion of the reaction between the cyclic and linear organosiloxanes the acid catalyst is neutralized using a basic material, such as sodium bicarbonate, that will not cause rearrangement of the reaction product.

The liquid phase of the reaction mixture is then separated from the solid neutralization by-product by filtration and concentrated under reduced pressure with heating to remove volatile materials. The residual material, which consists essentially of an inhibitor of this invention, is a liquid polyorganosiloxane exhibiting a viscosity of from about $1 \times 10^4$ to about $1 \times 10^2$ meters$^2$/sec. at 25° C., and can be used as an inhibitor without further purification.

In accordance with one embodiment of this invention the present inhibitors are added to curable organosiloxane compositions comprising at least one polyorganosiloxane (ingredient A) containing an average of two vinyl or other ethylenically unsaturated hydrocarbon radicals per molecule, an organohydrogensiloxane (ingredient B) and a platinum-containing hydrosilation catalyst.

Ingredient A preferably consists essentially of a polydiorganosiloxane containing a vinyl radical bonded to each of the two terminal silicon atoms. The repeating units of this ingredient can be represented by the formula R*R**SiO, where R* and R** are each monovalent hydrocarbon radicals or perfluoroalkylethyl radicals wherein the perfluoroalkyl portion contains from 1 to about 8 carbon atoms. Preferably R* is methyl or phenyl and R** is methyl, phenyl or 3,3,3-trifluoropropyl, these preferences being based on the availability and cost of the reactants used to prepare the polydiorganosiloxane and the properties of materials obtained by curing these polymers.

If it is desired to prepare a cured material that will not be softened or dissolved by liquid hydrocarbons, at least 50 mole percent of the repeating units in the polydiorganosiloxane should contain a perfluoroalkylethyl radical such as 3,3,3-trifluoropropyl.

It will be understood that Ingredient A can contain a small concentration, typically less than about 1 mole percent, of branching resulting from the presence of trifunctional units corresponding to the formula R*SiO$_{3/2}$ or R**SiO$_{3/2}$ in the polymer molecule. These units are typically the result of impurities present in the reactants used to prepare the polydiorganosiloxane.

Ingredient A is cured by reacting it with a relatively low molecular weight, liquid organohydrogensiloxane (ingredient B) containing an average of at least three silicon bonded hydrogen atoms per molecule. Ingredient B, also referred to hereinafter as the curing agent can contain from as few as four silicon atoms per molecule up to an average of 20 or more, and exhibits a viscosity of up to 10 Pa.s or higher at 25° C. The curing agent typically contains repeating units of the formulae HSiO$_{1.5}$, R#$_2$ HSiO, and/or R#$_2$ HSiO$_{0.5}$. The curing agent may also include one or more monoorganosiloxane, diorganosiloxane, triorganosiloxy and SiO$_2$ units, none of which contain silicon bonded hydrogen atoms. In these formulae R# is a monovalent hydrocarbon radical as defined hereinabove for the R* radical of the polydiorganosiloxane. Alternatively, the crosslinker can be a cyclic compound containing diorganosiloxane and organohydrogensiloxane units or a compound of the formula Si(OSiR#$_2$ H)$_4$.

Preferably R# is methyl or 3,3,3-trifluoropropyl, and the curing agent is a linear triorganosiloxy terminated polyorganohydrogensiloxane or a diorganosiloxane/organohydrogensiloxane copolymer containing an average of from 10 to about 50 repeating units per molecule of which from 3 to 5 are organo hydrogensiloxane units.

In accordance with a second embodiment of this invention ingredient A contains at least three vinyl radicals per molecule and ingredient B contains two silicon bonded hydrogen atoms that are preferably located at terminal positions on the molecule. In this embodiment ingredient B is preferably a diorganohydrogensiloxy terminated polydiorganosiloxane.

The molecular weights of the polydiorganosiloxane and curing agent together with the relative concentrations of these ingredients and the number and distribution of the silicon-bonded hydrogen atoms and ethylenically unsaturated hydrocarbon radicals will determine the concentration and location of crosslinks in the cured material. The concentration of crosslinks per unit area is often referred to as the "crosslink density" and determines certain physical properties of the cured material, particularly hardness, compressibility and resiliency. The particular combinations of polydiorganosiloxane(s)

and curing agent(s) yielding the desired combination of physical properties can readily be determined by routine experimentation.

The molar ratio of silicon bonded hydrogen atoms to vinyl or other ethylenically unsaturated hydrocarbon radicals present in the curable compositions is a major factor in determining the properties of the cured material, such as tensile strength, hardness and modulus.

Because of the difficulty often experienced in achieving a complete reaction between all of the silicon bonded hydrogen atoms and all of the vinyl or other ethylenically unsaturated hydrocarbon radicals present in the reaction mixture, it is often desirable to have a stoichiometric excess of one of these species in a curable composition. The preferred ratio for a given composition will be determined at least in part by the average molecular weight of the vinyl containing polyorganosiloxanes, the curing agent and the physical properties of the cured product.

The present inhibitors are used with hydrosilation catalysts that are either a platinum group metal or a compound of such a metal. Platinum compounds such as hexachloroplatinic acid, and particularly complexes of these compounds with relatively low molecular weight vinyl-containing organosiloxanes, are preferred catalysts because of their high activity and compatibility with the organosiloxane reactants. These complexes are described in U.S. Pat. No. 3,419,593 that issued to David N. Willing on Dec. 31, 1968. Complexes wherein the silicon bonded hydrocarbon radicals are vinyl and either methyl or 3,3,3-trifluoropropyl are particularly preferred because of their ability to catalyze a rapid curing of the elastomer at temperatures of at least about 70° C.

The platinum containing catalyst can be present in an amount equivalent to as little as one part by weight of platinum per one million parts of curable composition. Catalyst concentrations equivalent to from 5 to 50 parts of platinum per million of curable composition are preferred to achieve a practical curing rate. Higher concentrations of platinum provide only marginal improvements in curing rate, and are therefore economically unattractive, particularly when the preferred catalysts are used.

As little as ten moles of one of the present inhibitors per mole of platinum will sometimes provide the desired storage stability and/or working time at temperatures of about 25° C. In other instances it may require up to 500 moles of inhibitor per mole of platinum to achieve the desired results. The optimum concentration for a given inhibitor in a given composition can readily be determined by routine experimentation and does not constitute part of this invention.

The present inhibitors themselves can constitute up to 100 percent of the ethylenically unsaturated polyorganosiloxane reactant (ingredient A) in a composition that is curable by a platinum catalyzed hydrosilation reaction using the organohydrogensiloxanes and platinum-containing hydrosilation catalysts described hereinbefore. The resultant composition is self inhibiting and can be stored for several hours, or in some cases days, at temperatures of about 25° C. without exhibiting any substantial increase in viscosity, yet cures in one hour or less at temperatures of at least about 100° C.

If at least one of the present inhibitors constitutes more than about 50 mole percent of the ethylenically unsaturated polyorganosiloxane reactants (ingredient A) present in a curable composition and the cured product is intended to be a gel or elastomer, a corresponding portion of the curing agent (ingredient B) should preferably be an organohydrogensiloxane containing an average of two silicon bonded hydrogen atoms per molecule. A preferred curable composition of this type is one wherein one of the present inhibitors constitutes the entire portion of ingredient A and ingredient B is a diorganohydrogen siloxy terminated polydiorganosiloxane. Most preferably the repeating units in both of these ingredients are methyl-3,3,3-trifluoropropylsiloxy units.

An advantage of the present inhibitors relative to prior art organosiloxane inhibitors is the ease with which the present inhibitors can be made compatible with different vinyl-containing polymers (ingredient A) by varying the hydrocarbon radicals on the polycyclosiloxanes use as starting materials to prepare the inhibitors. As discussed hereinabove, the ability to match the refractive indices of the inhibitor and the curable vinyl-containing polymer is particularly advantageous when preparing optically clear cured organosiloxane compositions such as gels.

An additional advantage of the present inhibitors is that they are non-volatile at the temperatures conventionally used to prepare and cure organosiloxane compositions.

The following examples demonstrate the preparation of preferred inhibitors and should not be interpreted as limiting the scope of the invention as defined in the accompanying claims. All parts and percentages in the examples are by weight unless otherwise stated.

EXAMPLE 1

A glass reactor equipped with a mechanically operated stirrer, reflux condenser and heating means was charged with the following reactants.

1872 parts of 2,4.6-trimethyl-2,4,6-tris(3,3,3-trifluoropropyl) cyclotrisiloxane;

344 parts of 2,4,6,8-tetramethyl-2,4,6,8-tetravinylcyclotetrasiloxane; and 310 parts of a trimethylsiloxy terminated polydimethylsiloxane containing an average of 20 dimethylsiloxane units per molecule.

The resultant mixture was stirred at room temperature for a few moments to make it homogeneous, at which time 0.5 part of trifluoromethanesulfonic acid was added. The reaction mixture was then heated at a temperature of 55° C. for three hours, at which time the reaction mixture exhibited a viscosity of $0.064 \times 10^{-3}$ m$^2$/sec. The reaction mixture was then cooled to room temperature and neutralized by the addition of 92.0 parts of sodium bicarbonate. After stirring for 24 hours at room temperature the liquid phase of the reaction mixture was isolated by filtration and concentrated by heating it for one hour at a temperature of 200° C. under a pressure of 40 milipascals. The concentrated liquid, which consisted essentially of an inhibitor of this invention, was obtained in 82% yield, exhibited a viscosity of $1.42 \times 10^{-4}$ m$^2$/sec., and contained 2.51 weight percent vinyl radicals.

A curable polyorganosiloxane composition was prepared by blending the following ingredients to homogeniety.

25 parts of a dimethylvinylsiloxy terminated poly(methyl-3,3,3-trifluoropropyl)siloxane containing an average of 20 methyl-3,3,3-trifluoropropylsiloxane units per molecule (ingredient A);

0.039 part of a platinum-containing hydrosilation catalyst prepared by reacting 30 parts of hexachloroplatinic acid with 16.5 parts of a dimethylvinylsiloxy terminated poly(methyl-3,3,3-trifluoropropyl)siloxane containing an average of 30 methyl-3,3,3-trifluoropropylsiloxane units per molecule (ingredient C);

0.55 part of an organohydrogensiloxane containing two dimethylhydrogensiloxy units separated by 1, 2 or 3 units of the formula

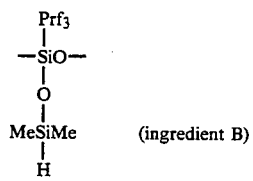

(ingredient B)

where prfer represents 3,3,3-trifluoropropyl; 2.22 parts of a dimethylhydrogensiloxy terminated poly(methyl-3,3,3-trifluoropropyl)siloxane containing an average of 3 methyl-3,3,3-trifluoropropylsiloxane units per molecule.

0.1, 0.2 or 0.5 part of the inhibitor described in the first section of this example.

The resultant curable composition was optically clear. One portion of this curable composition was stored at 25° C. and tested at one hour intervals between the hours of 8 A.M. and about 4 P.M. by inserting a metal spatula into the composition and slowly withdrawing the spatula together with a portion of the composition adhering to the tip of the spatula. The time interval following which the composition first pulled away from the tip of the spatula in a manner similar to a released elongated rubber band was recorded as the "snap time".

A second portion of the composition was cured to a gel by heating for ½ hour at a temperature of 125° C., at which time the extent of cure was measured using a penetrometer (catalog no. 73,510, manufactured by Precision Scientific Company). The standard cones supplied with the instrument were replaced with a cylindrical brass head measuring 6.350 mm. in diameter, 4.762 mm. in height and having a flat bottom and rounded edges. The total weight of the shaft and head was 19.5 grams.

The "snap" time and penetration for each of the gel samples are recorded in the following table.

| Inhibitor (parts) | Snap Time hours @ 25° C. | Penetration (mm) ½ hour @ 150° C. |
| --- | --- | --- |
| 0.1 | 8 | 8 |
| 0.2 | 8-16* | 13 |
| 0.5 | 30-44** | 15 |

*There was an eight hour interval between successive evaluations. The actual snap time was somewhere within this interval.
**There was a fourteen hour interval between successive evaluations. The actual snap time was somewhere within this interval.

For purpose of comparison 6 parts of ingredient A were blended with 0.14 part of four prior art platinum catalyst inhibitors andd the resulting mixtures rated for optical clarity on a scale of 1 (optically clear) to 5 (very cloudy).

| Inhibitor | Rating |
| --- | --- |
| (MeViSiO)$_3$ | 3 |
| (MeViSiO)$_3$ | 4 |
| 1-ethynyl-1-cyclohexanol | 5 |
| 2-methyl-3-butyn-2-ol | 2 |

EXAMPLE 2

An inhibitor of this invention was prepared using the procedure described in the preceding Example 1 with the following reactants.

528 parts of 2,4,6-trimethyl-2,4,6-tris-3,3,3-trifluoropropyl)cyclotrisiloxane 83 parts of 2,4,6-trimethyl-2,4,6-trivinylcyclotrisiloxane 27 parts of a dimethylvinylsiloxy terminated polydimethylsiloxane containing an average of 6 dimethylsiloxy units per molecule;

0.95 part of trifluoromethanesulfonic acid; and 50.0 parts of sodium bicarbonate.

A curable composition was prepared by combining the resultant inhibitor with the following amounts of ingredients A, B, and C identified in Example 1.

25 parts ingredient A
0.039 parts ingredient B

Ingredient C and inhibitor in the amounts specified in the following table.

The compositions were stored at 25° C. for snap time determinations and cured for ½ hour at 125° C. for measurement of penetration values as described in Example 1.

| Ingred. C (parts) | Inhibitor (parts) | Snap Time (hours) @ 25° C. | Penetration ½ hour @ 150° C. |
| --- | --- | --- | --- |
| 1.06 | 0.0 | 0.33 | 6 |
| 1.06 | 0.1 | 5.5 | 6 |
| 1.07 | 0.2 | 6-23* | 6 |
| 1.11 | 0.5 | 30 | 6 |

*There was a seventeen hour time interval between successive evaluations. The Actual snap time was within this interval.

These data demonstrate the ability of the present inhibitors to substantially increase the working time of a polyorganosiloxane composition at 25° C. without substantially decreasing the cure rate of the composition at conventional curing temperatures.

EXAMPLE 3

This example describes a curable composition wherein the vinyl-containing polyorganosiloxane (polymer A) is an inhibitor of this invention.

Preparation of Polymer A

A glass reactor equipped with a mechanically operated stirrer, reflux condenser and heating means was charged with the following reactants.

100 parts of 2,4,6-trimethyl-2,4,6-tris(3,3,3-trifluoropropyl)cyclotrisiloxane;

46.3 parts of octamethylcyclotetrasiloxane;

8.6 parts of 2,4,6,8-tetramethyl-2,4,6,8-tetravinylcyclotetrasiloxane; and 2.3 parts of sym-tetramethyldivinyldisiloxane.

The resultant mixture was stirred at room temperature for a few minutes to make it homogeneous, at which time 0.15 part of trifluoromethanesulfonic acid was added. The reaction mixture was then heated at a temperature of 55° C. for about three hours, at which time the reaction mixture exhibited a viscosity of $4 \times 10^{-4}$ m$^2$/sec. The reaction mixture was then cooled to room temperature and neutralized by the addition of 20 parts of sodium bicarbonate. After stirring for about 16 hours at room temperature the liquid phase of the reaction mixture was isolated by filtration and concentrated by heating it for one hour at a temperature of 200° C. under a pressure of 40 milipascals. The concentrated liquid, which consisted essentially of polymer A. an inhibitor of this invention, was obained in 85% yield, exhibited a viscosity of $1.1 \times 10^{-3}$ m$^2$/sec., and contained 1.24 weight percent of vinyl radicals.

For comparison purposes a second polymer, referred to hereinafter as polymer X, was prepared using the same types and amounts of reactants and procedure as ingredient A, with the exception of the catalyst and sodium bicarbonate. The trifluoromethanesulfonic acid was replaced with 0.6 parts of potassium silanolate, and the sodium bicarbonate with a sufficient amount of solid carbon dioxide ("dry" ice) to neutralize the reaction mixture.

Unlike trifluoromethanesulfonic acid, silanlolate catalysts are known to cause rearrangement of silicon-to-oxygen bonds. It was therefore expected that many of the sequences of four methylvinylsiloxy units present in the cyclic siloxane reactant would not appear in the final product. By comparison, it was expected that polymer A would contain substantially all of the sequences of four methylvinylsiloxy units present in the corresponding cyclic tetrasiloxane reactant.

Polymer X was obtained in 45 percent yield, exhibited a viscosity of $1.4 \times 10^{-3}$ m$^2$/sec. and contained 1.16 percent of vinyl radicals.

Curable compositions were prepared by combining 25 parts of either polymer A or polymer X with either 6.6 parts (molar ratio SiH/vinyl=1.7) or 4.95 parts (molar ratio SiH/vinyl =1.3) of a dimethylhydrogensiloxy terminated poly(methyl-3,3,3-trifluoropropyl)-siloxane containing an average of three methyl-3,3,3-trifluoropropylsiloxane units per molecule and 0.1 part of the platinum hydrosilation catalyst described in the preceding example 1. Samples of each of the four compositions were stored at 25° C., 50° C. and 115° C. and tested for "snap" at one hour intervals between the hours of 8 A.M. and 4 P.M. as described in the preceding Example 1. The results of this evaluation are set forth in the following table together with the molar ratio of silicon bonded hydrogen atoms to vinyl radicals in each of the curable compositions.

| Polymer | A | A | X | X |
| --- | --- | --- | --- | --- |
| SiH/Vinyl Ratio | 1.0 | 0.75 | 1.0 | 0.75 |
| Snap Time (25° C.) | 96 Hr | 96 Hr | 4–18 Hr* | 4–18 Hr* |
| Snap Time (50° C.) | 3–18 Hr* | 3–18 Hr* | 1 Hr. | 1½ Hr |
| Snap Time (115° C.) | 9 Min. | 8 Min. | 4 Min. | 5 Min. |

*There was a 14 or 15 hour interval between two successive measurements. The actual snap time occurred somewhere during this interval.

The data in this table demonstrate the ability of the present inhibitors to increase the working time of a curable composition at temperatures of 25° C. and 50° C. when used as the vinyl-containing polyorganosiloxane reactant.

That which is claimed is:

1. A platinum catalyst inhibitor for extending the working time at 25° C. of polyorganosiloxane compositions curable by a platinum catalyzed hydrosilation reaction without substantially decreasing the cure rate of said compositions at temperatures of at least about 100° C. where said inhibitor is represented by the average formula RR'MeSi(OSiMeR")$_x$[(OSiR'''Vi)$_y$]$_z$OSiRR'Me where Me represents methyl, Vi represents vinyl, R represents methyl, ethyl, phenyl or —CH2CH2Rf, R' represents methyl or vinyl, each R" and R''' are individually selected from the same group of radicals represented by R, Rf represents a perfluoroalkyl radical containing from 1 to 8 carbon atoms, the value of x is at least 4, the value of y is from 2 to 5, the value of z is at least 1, and said inhibitor is the product of an acid-catalyzed polymerization of a first cyclic diorganosiloxane containing repeating units of the formula MeR"SiO and a second cyclic diorganosiloxane containing repeating units of the formula R'''ViSiO, where said polymerization is conducted in the presence of an organosilicon compound comprising at least one unit of the formula RR'MeSiX where X represents a hydrolyzable atom or group.

2. The inhibitor of claim 1 where R is methyl or phenyl, R'is vinyl, R" is methyl, phenyl or 3,3,3-trifluoropropyl, R''' is methyl, the value of x is from 10 to 100, inclusive, the value of y is 3 or 4 and the value of z is from 1 to 10, inclusive.

3. A polyorganosiloxane composition curable by a platinum-caalyzed hydrosilation reaction, said composition comprising a triorganosiloxy terminated polydiorganosiloxane containing two vinyl radicals per molecule, an organohydrogensiloxane containing at least three silicon bonded hydrogen atoms per molecule in an amount sufficient to cure said composition in the presence of a platinum hydrosilation catalyst, a platinum hydrosilation catalyst in an amount sufficient to promote curing of said composition at a temperature of at least 100° C. and a platinum catalyst inhibitor in an amount sufficient to extend the working life of said composition at 25° C. without any substantial reduction in the cure rate of said composition at temperature above about 100° C., where said inhibitor is represented by the average formula RR'MeSi(OSiMeR")$_x$[(OSiR'''Vi)$_y$]$_z$OSiRR'Me where Me represents methyl, Vi represents vinyl, R represents methyl, ethyl, phenyl or —CH2CH2Rf, R' represents methyl or vinyl, each R" and R" are individually selected from the same group of radicals represented by R, Rf represents a perfluoroalkyl radical containing from 1 to 8 carbon atoms, the value of x is at least 4, the value of y is from 2 to 5, the value of z is at least 1, and said inhibitor is the product of an acid-catalyzed polymerization of a first cyclic diorganosiloxane containing repeating units of the formula MeR"SiO and a second cyclic diorganoxiloxane containing repeating units of the formula R'''ViSiO, where said polymerization is conducted in the presence of an organosilicon compound comprising at least one unit of the formula RR'MeSiX where X represents a hydrolyzable atom or group.

* * * * *